US 8,972,551 B1
Mar. 3, 2015

(12) United States Patent
Yanacek et al.

(54) PRIORITIZING SERVICE REQUESTS

(75) Inventors: David C. Yanacek, Seattle, WA (US);
Drew Evan Atkin, Needham, MA (US);
Paul Lee Coleman, IV, Snoqualmie,
WA (US)

(73) Assignee: Amazon Technologies, Inc., Seattle, WA
(US)

( * ) Notice: Subject to any disclaimer, the term of this
patent is extended or adjusted under 35
U.S.C. 154(b) by 1190 days.

(21) Appl. No.: 12/768,297

(22) Filed: Apr. 27, 2010

(51) Int. Cl.
*G06F 15/173* (2006.01)

(52) U.S. Cl.
USPC .......................... 709/223; 709/200; 709/240

(58) Field of Classification Search
USPC ................................. 709/200, 223, 240, 206
See application file for complete search history.

(56) References Cited

U.S. PATENT DOCUMENTS

| | | | | |
|---|---|---|---|---|
| 5,289,460 | A * | 2/1994 | Drake et al. | 370/245 |
| 5,862,223 | A * | 1/1999 | Walker et al. | 705/50 |
| 6,442,550 | B1 * | 8/2002 | Rajamony | 709/217 |
| 6,601,084 | B1 * | 7/2003 | Bhaskaran et al. | 718/105 |
| 6,810,038 | B1 * | 10/2004 | Isoyama et al. | 370/395.42 |
| 6,868,061 | B1 * | 3/2005 | Kilkki et al. | 370/230.1 |
| 6,917,984 | B1 * | 7/2005 | Tan | 709/238 |
| 6,922,725 | B2 * | 7/2005 | Lamming et al. | 709/227 |
| 7,042,891 | B2 * | 5/2006 | Oberman et al. | 370/412 |
| 7,185,070 | B2 * | 2/2007 | Paul et al. | 709/220 |
| 7,243,351 | B2 * | 7/2007 | Kundu | 718/102 |
| 7,305,431 | B2 * | 12/2007 | Karnik et al. | 709/203 |
| 7,412,234 | B2 * | 8/2008 | Zellner | 455/456.3 |
| 7,908,346 | B2 * | 3/2011 | Boykin et al. | 709/219 |
| 7,954,107 | B2 * | 5/2011 | Mao et al. | 719/310 |
| 8,180,922 | B2 * | 5/2012 | Dini et al. | 709/241 |
| 8,224,942 | B1 * | 7/2012 | Presotto et al. | 709/223 |
| 8,296,417 | B1 * | 10/2012 | Gershon et al. | 709/224 |
| 8,307,031 | B1 * | 11/2012 | Grieve | 709/203 |
| 8,549,149 | B2 * | 10/2013 | Sundarrajan et al. | 709/227 |
| 2002/0090075 | A1 * | 7/2002 | Gabriel | 379/265.01 |
| 2002/0118692 | A1 * | 8/2002 | Oberman et al. | 370/419 |
| 2002/0146102 | A1 * | 10/2002 | Lang | 379/114.02 |
| 2003/0046396 | A1 * | 3/2003 | Richter et al. | 709/226 |
| 2003/0135632 | A1 * | 7/2003 | Vrzic et al. | 709/231 |
| 2003/0156547 | A1 * | 8/2003 | Peleg | 370/252 |
| 2003/0187982 | A1 * | 10/2003 | Petit | 709/225 |
| 2004/0006601 | A1 * | 1/2004 | Bernstein et al. | 709/207 |

(Continued)

OTHER PUBLICATIONS

Jun Wang; "Defending Against Denial of Web Services Using Sessions", C&C Research Laboratories, NEC Europe Ltd., Sankt Augustin, Germany, pp. 1-6.

(Continued)

*Primary Examiner* — Anthony Mejia
(74) *Attorney, Agent, or Firm* — Thomas | Horstemeyer, LLP

(57) ABSTRACT

Disclosed are various embodiments for prioritizing service requests. A service request destined for processing by a service provider is obtained in at least one computing device. The service provider is configured to provide a service. The service request includes at least one client-specified parameter indicating a priority of the service request. A load associated with the service is determined. The service request is prioritized for an initial processing stage of the service provider when the load meets at least one threshold. The prioritizing for the initial processing stage is based at least in part on the at least one client-specified parameter. The service request is prioritized for an additional processing stage of the service provider when the load meets the at least one threshold. The prioritizing for the additional processing stage is based at least in part on the at least one client-specified parameter and a result of the initial processing stage.

24 Claims, 4 Drawing Sheets

(56) References Cited

U.S. PATENT DOCUMENTS

| | | | |
|---|---|---|---|
| 2004/0019680 A1* | 1/2004 | Chao et al. | 709/226 |
| 2004/0117794 A1* | 6/2004 | Kundu | 718/102 |
| 2004/0198386 A1* | 10/2004 | Dupray | 455/456.1 |
| 2005/0081246 A1* | 4/2005 | Barrett et al. | 725/105 |
| 2005/0207411 A1* | 9/2005 | Ota et al. | 370/389 |
| 2005/0273456 A1* | 12/2005 | Revanuru et al. | 707/1 |
| 2006/0034445 A1* | 2/2006 | Shelton | 379/266.01 |
| 2006/0089999 A1* | 4/2006 | Xiang et al. | 709/229 |
| 2006/0106938 A1* | 5/2006 | Dini et al. | 709/228 |
| 2007/0201366 A1* | 8/2007 | Liu | 370/235 |
| 2007/0201481 A1* | 8/2007 | Bhatia et al. | 370/395.2 |
| 2007/0230342 A1* | 10/2007 | Skog | 370/232 |
| 2007/0250565 A1* | 10/2007 | Minow | 709/203 |
| 2008/0075261 A1* | 3/2008 | Ramanathan et al. | 379/220.01 |
| 2009/0094611 A1* | 4/2009 | Danne et al. | 718/105 |
| 2009/0132491 A1* | 5/2009 | Desaraju et al. | 707/3 |
| 2009/0161540 A1* | 6/2009 | Zaki et al. | 370/230 |
| 2009/0262923 A1* | 10/2009 | Anerousis et al. | 379/265.09 |
| 2010/0017460 A1* | 1/2010 | Shen et al. | 709/203 |
| 2010/0023582 A1* | 1/2010 | Pedersen et al. | 709/203 |
| 2010/0174818 A1* | 7/2010 | Soldan et al. | 709/227 |
| 2010/0192190 A1* | 7/2010 | Savoor et al. | 725/109 |
| 2010/0223395 A1* | 9/2010 | Elliot et al. | 709/232 |
| 2010/0268834 A1* | 10/2010 | Eidelman et al. | 709/230 |
| 2011/0004921 A1* | 1/2011 | Homer et al. | 726/3 |
| 2011/0055444 A1* | 3/2011 | Henriksson et al. | 710/244 |
| 2011/0078285 A1* | 3/2011 | Hawkins et al. | 709/219 |
| 2011/0107358 A1* | 5/2011 | Shyam et al. | 719/330 |
| 2011/0131193 A1* | 6/2011 | Pasupuleti et al. | 707/704 |
| 2011/0154420 A1* | 6/2011 | Korte et al. | 725/109 |
| 2011/0173637 A1* | 7/2011 | Brandwine et al. | 719/314 |
| 2011/0267945 A1* | 11/2011 | Shrum, Jr. | 370/233 |
| 2012/0078994 A1* | 3/2012 | Jackowski et al. | 709/202 |
| 2012/0117214 A1* | 5/2012 | Mengle et al. | 709/223 |
| 2012/0151003 A1* | 6/2012 | Murray et al. | 709/219 |
| 2012/0159090 A1* | 6/2012 | Andrews et al. | 711/153 |
| 2012/0220261 A1* | 8/2012 | Grefen et al. | 455/406 |
| 2012/0254300 A1* | 10/2012 | Rai et al. | 709/203 |
| 2012/0314593 A1* | 12/2012 | Liu | 370/252 |
| 2012/0324111 A1* | 12/2012 | Barzel et al. | 709/226 |
| 2013/0159384 A1* | 6/2013 | Funge et al. | 709/203 |

OTHER PUBLICATIONS

Bhatti, Friedrich; "Web Server Support for Tiered Services", Internet Systems and Applications Laboratory, HP Laboratories Pal Alto, HPL-1999-160, Dec. 1999, cover page and pp. 1-16.

Ryu, Kim, Hong; "Towards Supporting Differentiated Quality of Web Service", Dept. of Computer Science and Engineering, POSTECH, pp. 1-6, Jan. 2008.

* cited by examiner

PRIORITIZING SERVICE REQUESTS

BACKGROUND

In the context of a service-oriented architecture, a service provides software functionality in such a way that disparate systems are interoperable. The software functionality provided by a service often encompasses business logic. For each service, there will be at least one service provider and any number of service clients configured to communicate with the service provider(s). When the service provider(s) are overloaded with service requests, the service clients may experience diminished performance for many of their pending service requests.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to prioritizing service requests during a brownout condition. During a brownout condition, service providers may be so overloaded beyond their capacities that performance may be substantially reduced across some or all service requests. However, some service requests may be more important than others. As a non-limiting example, a service request involved in processing an order of a customer for an online retailer may be more important than a service request involved in determining optional features to be included in a product search network page. Consequently, it may be desirable to prioritize the processing of requests so that at least high priority requests are processed, while low priority requests may be dropped or otherwise receive degraded performance. In the following discussion, a general description of the system and its components is provided, followed by a discussion of the operation of the same.

Figure 1:
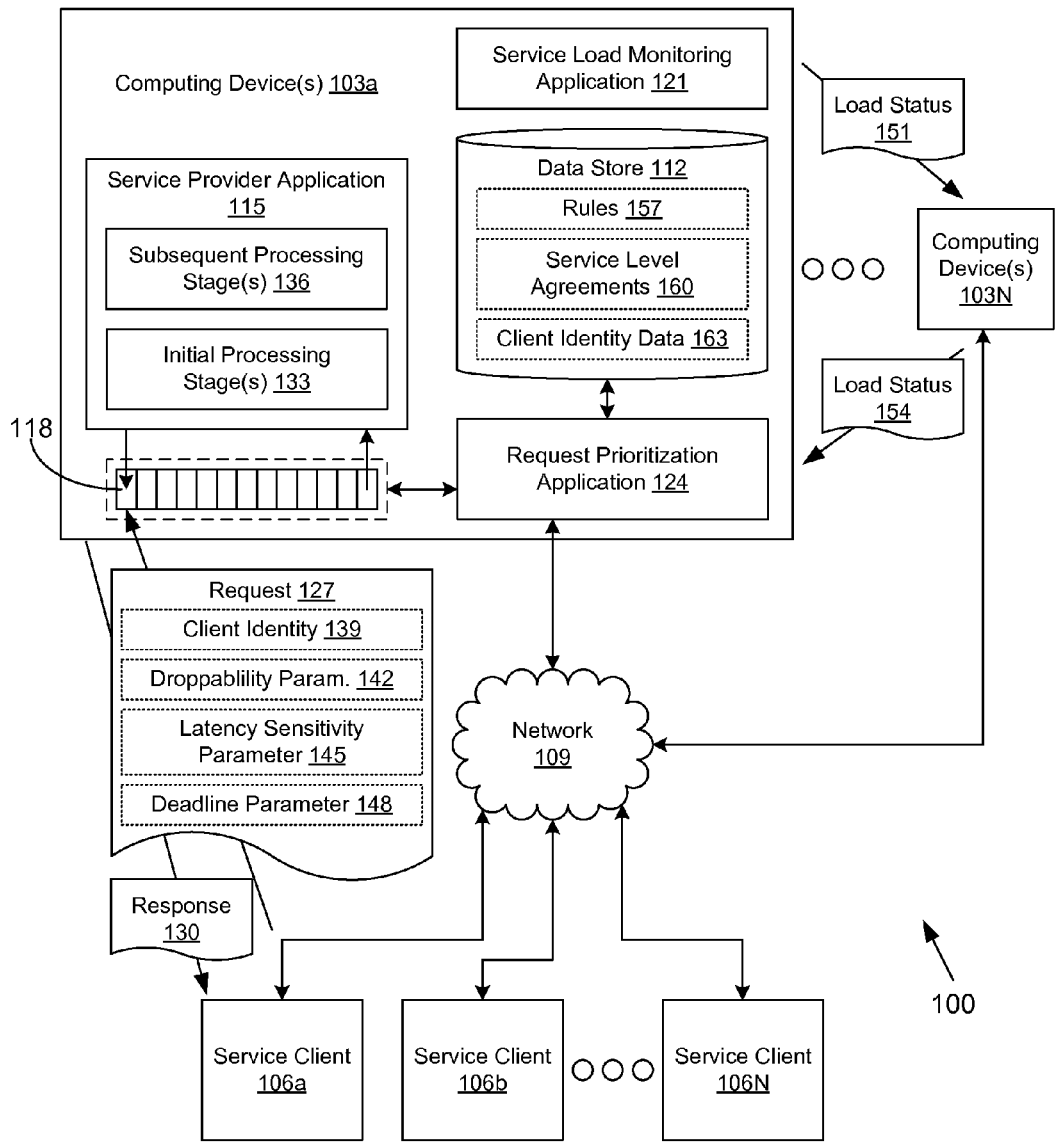
FIG. 1 is a drawing of networked environment according to various embodiments of the present disclosure.

With reference to FIG. 1, shown is a networked environment 100 according to various embodiments. The networked environment 100 includes a plurality of one or more computing devices 103 and a plurality of service clients 106 in data communication by way of a network 109. The network 109 includes, for example, the Internet, intranets, extranets, wide area networks (WANs), local area networks (LANs), wired networks, wireless networks, or other suitable networks, etc., or any combination of two or more such networks.

Each computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. In one embodiment, each computing device 103 represents a virtualized computer system executing on one or more physical computing systems. For purposes of convenience, each computing device 103 is referred to herein in the singular. Even though the computing device 103 is referred to in the singular, it is understood that a plurality of computing devices 103 may be employed for each computing device 103 in the various arrangements as described above.

Various applications and/or other functionality may be executed in each computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on each computing device 103, for example, may include a service provider application 115, a queue 118, a service load monitoring application 121, a request prioritization application 124, and other applications, services, processes, systems, engines, or functionality not discussed in detail herein. The service provider application 115 implements a service. The service provider application 115 is executed to receive service requests 127 from service clients 106, to process the service requests 127, and to generate service responses 130 that are returned to the respective service clients 106.

To this end, the service provider application 115 may include one or more initial processing stages 133 and one or more subsequent processing stages 136. The initial processing stages 133 may be configured to perform initial processing of the service request 127. One example of initial processing may be to authenticate the service client 106 or otherwise verify the identity of the service client 106 that originated the request 127. The subsequent processing stages 136 may be configured to perform the business logic that is core to the service. Both initial processing stages 133 and subsequent processing stages 136 may involve data communication with various other computing systems.

A request 127 may include various data relating to a service call. A request 127 may also include a client identity 139, which, in various embodiments, may include data used to specify the identity of the service client 106 that originated the request 127. As a non-limiting example, client identity 139 may include a username, a password, a signature, an authentication token, and/or other credentials for authentication. In another embodiment, the client identity 139 may comprise merely an originating network address that may be used by the service provider application 115 to ascertain the identity of the service client 106.

Additionally, a request 127 may include various client-specified parameters for use in determining a priority of the request 127. Such client-specified parameters may include, for example, a droppability parameter 142, a latency sensitivity parameter 145, a deadline parameter 148, and/or other parameters. The droppability parameter 142 indicates whether the request 127 may be dropped. As non-limiting examples, the request 127 may produce a result that is optional for the calling application, the result may be of relatively low value to the owner of the calling application, the calling application may be able to fail gracefully without the result, etc. In one embodiment, the droppability parameter 142 has a Boolean value.

The latency sensitivity parameter 145 indicates whether the request 127 is sensitive to latency. In one embodiment, the latency sensitivity parameter 145 may take on a range of values from not latency sensitive to highly latency sensitive. In another embodiment, the latency sensitivity parameter 145 has a Boolean value. The latency sensitivity parameter 145 may be used, for example, to sequence the processing of requests 127. As a non-limiting example, a request 127 associated with an online interactive application may be more latency sensitive than a request 127 associated with a batch processing application that may be run at any time.

The deadline parameter 148 indicates a timestamp or other time value by which the processing of the request 127 must be completed for the result to be useful to the calling application. As a non-limiting example, the result of the request 127 may be out-of-date if it is returned to the calling application past the specified deadline. In one embodiment, the deadline parameter 148 relates to a time of production for the result of the request 127. In another embodiment, the deadline parameter relates to a time of delivery of the result of the request 127.

A response 130 may be produced by the service provider application 115 in responding to the request 127. The response 130 may include, for example, a serialized data object or other data structure containing the results from the initial processing stage(s) 133 and/or the subsequent processing stages 136. In one embodiment, the response 130 may merely indicate whether the corresponding request 127 was processed successfully. The response 130 may be optional, as no confirmation may be needed for some types of requests 127. In one embodiment, the service provider application 115 may aggregate the results of multiple requests 127 into fewer responses 130 or one response 130 as desired.

The queue 118 is provided to store requests 127 as they arrive at the computing device 103 for processing by the service provider application 115. The queue 118 may comprise any first-in-first-out (FIFO) data structure or a service implementing ordering of requests 127. In one embodiment, any of the requests 127 in the queue 118 may be accessible by way of random access. The queue 118 may support reordering or resequencing of the requests 127 as needed, based upon corresponding priorities associated with the requests 127.

The service load monitoring application 121 is executed to monitor the processing load of the service provider application 115 and/or the computing device 103 on which it is executed. In one embodiment, the service load monitoring application 121 may calculate various metrics related to performance of the service provider application 115 such as, for example, number of concurrent requests 127, number of concurrent transmission control protocol (TCP) connections, number of concurrent HTTP connections, bandwidth used, processing resources used, memory resources used, latency in processing, and so on. Where a service is implemented using multiple instances of the service provider application 115, the service load monitoring application 121 may be configured to report the load status 151 determined for a computing device 103a to another computing device 103N. Likewise, the service load monitoring application 121 may receive a load status 154 from another computing device 103N. In this way, the service load monitoring application 121 may have a global perspective of the aggregate load across multiple instances of the service provider application 115.

In one embodiment, the load status 154 may correspond to a load status 154 of another instance of a service provider application 115 on the computing device 103N. In such an embodiment, the aggregate load across the service may be computed in a peer-to-peer manner. In another embodiment, a centralized server may be used to aggregate all of the load statuses 151 and report back an aggregate load status 154. Although the load statuses 151, 154 have been described as relating to one service, it is understood that the load statuses 151, 154 may relate to multiple services in various embodiments where the performance of one service may indicate or be tied in some way to the performance of another service.

The request prioritization application 124 is executed to prioritize the requests 127 as they are placed in the queue 118. To this end, the request prioritization application 124 may be configured to drop the requests 127 and then remove the dropped requests 127 from the queue 118. The request prioritization application 124 may be configured to return an error message to the service client 106 when a request 127 is dropped. The request prioritization application 124 may also be configured to reorder or resequence the requests 127 in the queue 118. Further, the request prioritization application 124 may be configured to mark requests 127 as degradable, such that the initial processing stage(s) 133 and/or the subsequent processing stage(s) 136 may deprioritize the request, thereby resulting in degraded performance. In one embodiment, the request prioritization application 124 may reside on a proxy server and direct requests 127 to specific instances of the service provider application 115, thereby performing a load balancing function. In one embodiment, the service provider application 115 and the request prioritization application 124 may be executable in different ones of the one or more computing devices 103.

The data stored in the data store 112 includes, for example, one or more rules 157, service level agreements 160, client identity data 163, and potentially other data. The rules 157 may define how the client-specified parameters in the requests 127 are to be interpreted and other server-side policies regarding the prioritization of requests 127. As non-limiting examples, the rules 157 may specify that certain service clients 106 are to receive degraded performance, based at least in part on the client identity 139, a request rate or resource consumption of the service client 106, and so on. The rules 157 may be preconfigured by the owner of the service.

The service level agreements 160 may define various service performance levels for service clients 106. For example, a service level agreement 160 may specify a maximum request rate, a minimum request rate, and/or other thresholds for a service client 106 or grouping of service clients 106. Accordingly, the current resource usage of the service client 106 or the grouping of service clients 106 may be evaluated against a corresponding service level agreement 160 to determine whether the requests 127 associated with the respective service clients 106 are to be given a relatively greater or lesser priority.

The client identity data 163 comprises data used to determine or verify the identity of a service client 106 provided as the client identity 139 in the request 127. In one embodiment, authentication of service clients 106 may be provided by a service executing on another computing device 103.

Each service client 106 may comprise, for example, a server computer, a client computer or any other computing system providing computing capability. Each service client 106 may represent multiple computer systems arranged, for example, in one or more server banks or other arrangements. To this end, a service client 106 may comprise, for example, a cloud computing resource, a grid computing resource, and/or any other distributed computing arrangement. Such computer systems may be located in a single installation or may be dispersed among many different geographical locations. In one embodiment, a service client 106 represents a virtualized computer system executing on one or more physical computing systems. For purposes of convenience, a service client 106 is referred to herein in the singular. However, in one embodiment, a service client 106 represents a plurality of computer systems arranged as described above.

Various applications and/or other functionality may be executed in the service client 106 according to various embodiments. In particular, the service client 106 is configured to make service calls on behalf of a calling application by sending requests 127 over the network 109 to the service provider application 115. The responses 130 may be returned to the service client 106 and to a calling application.

Next, a general description of the operation of the various components of the networked environment 100 is provided. To begin, various service clients 106a, 106b . . . 106N submit requests 127 to the service provider application 115, which may be executing on one or more of the computing devices 103a . . . 103N. The requests 127 may be sent over the network 109 using, for example, hypertext transfer protocol (HTTP), simple object access protocol (SOAP), and/or other protocols. The request 127 may comprise, for example, extensible markup language (XML), a serialized data object, and/or other data. Under normal operation, the requests 127 are placed in the queue 118 as they are received at the computing device 103 and processed by the service provider application 115 in the order that they are received. The service load monitoring application 121 reports the load status 151 of the service provider application 115 to other computing devices 103.

The request prioritization application 124 may determine that a brownout condition exists from the aggregate load associated with the service and determined from the load status 151 and/or one or more load statuses 154 obtained from other computing devices 103. A brownout condition may exist when the load associated with the service meets or exceeds one or more thresholds, which may be stored, for example, in rules 157 or in some other location. Such thresholds may be statically configured or empirically determined with respect to observed degraded performance relative to the service load. In one embodiment, thresholds may be established relative to the brownout condition thresholds, such that the thresholds may be met or exceeded by a load approaching but not yet indicating a brownout condition.

When the service load exceeds one or more thresholds associated with or determined relative to a brownout condition, the request prioritization application 124 begins prioritizing the requests 127. A request 127 having a droppability parameter 142 that indicates that the request 127 is droppable may consequently be dropped from the queue 118 and rejected. An error indication may be returned to the service client 106. In addition, when a request 127 has a deadline parameter 148 that indicates a deadline, and the request prioritization application 124 determines that the request 127 cannot be processed or delivered by the deadline, the request 127 may be dropped from the queue 118 and rejected. An error indication may be returned to the service client 106. Moreover, requests 127 that are not dropped may be resequenced in the queue 118 according to the latency sensitivity parameter 145.

An initial processing stage 133 of the service provider application 115 obtains a request 127 from the queue 118 and begins processing it. As a non-limiting example, the initial processing performed by the initial processing stage 133 may include determining and/or verifying the client identity 139 associated with the request. The initial processing stage 133 may then return the request 127 to the queue 118 for additional processing by one or more subsequent processing stages 136. In other embodiments, additional queues 118 may be used. In one embodiment, a separate queue 118 may be used after each initial processing stage 133 and/or subsequent processing stage 136.

When the request 127 is returned to the queue 118 or otherwise queued for further processing by a subsequent processing stage 136, the request prioritization application 124 may reprioritize the request 127 in view of the client-specified parameters and a result of an initial processing stage 133. Once the request prioritization application 124 verifies the client identity 139, various rules 157 may apply and affect the priority of the request 127. For example, notwithstanding the client-specified parameters, the service client 106 may have a current resource usage exceeding a maximum service level guarantee provided in the respective service level agreement 160.

Additionally, rules 157 may specify which requests 127 may then be dropped or otherwise deprioritized. Rules 157 may specify that requests 127 may be processed in a degraded manner. Rules 157 may enforce a restriction on one or more of the client-specified parameters based at least in part on the client identity 139. Rules 157 may define certain types of requests 127 that are to be prioritized relative to others. For example, a rule 157 may prioritize a request 127 associated with charging a credit card over a request 127 associated with determining similar products to showcase alongside another product. For example, a request 127 for information regarding one item may be prioritized relative to a request 127 for information regarding another item. For example, a request 127 with a certain type of HTTP header may be given a greater or lesser priority. It is understood that many such rules 157 may be configured, and these non-limiting examples of rules 157 are not exhaustive.

Once a request 127 has completed processing by the service provider application 115, a response 130 may be returned to the service client 106. In one embodiment, when a request 127 has been dropped, a response 130 may be returned to the service client 106 indicating that the request 127 has been rejected. The responses 130 may be sent over the network 109 using, for example, HTTP, SOAP, and/or other protocols. The response 130 may comprise, for example, XML, JavaScript object notation (JSON), a serialized data object, and/or other data.

Figure 2:
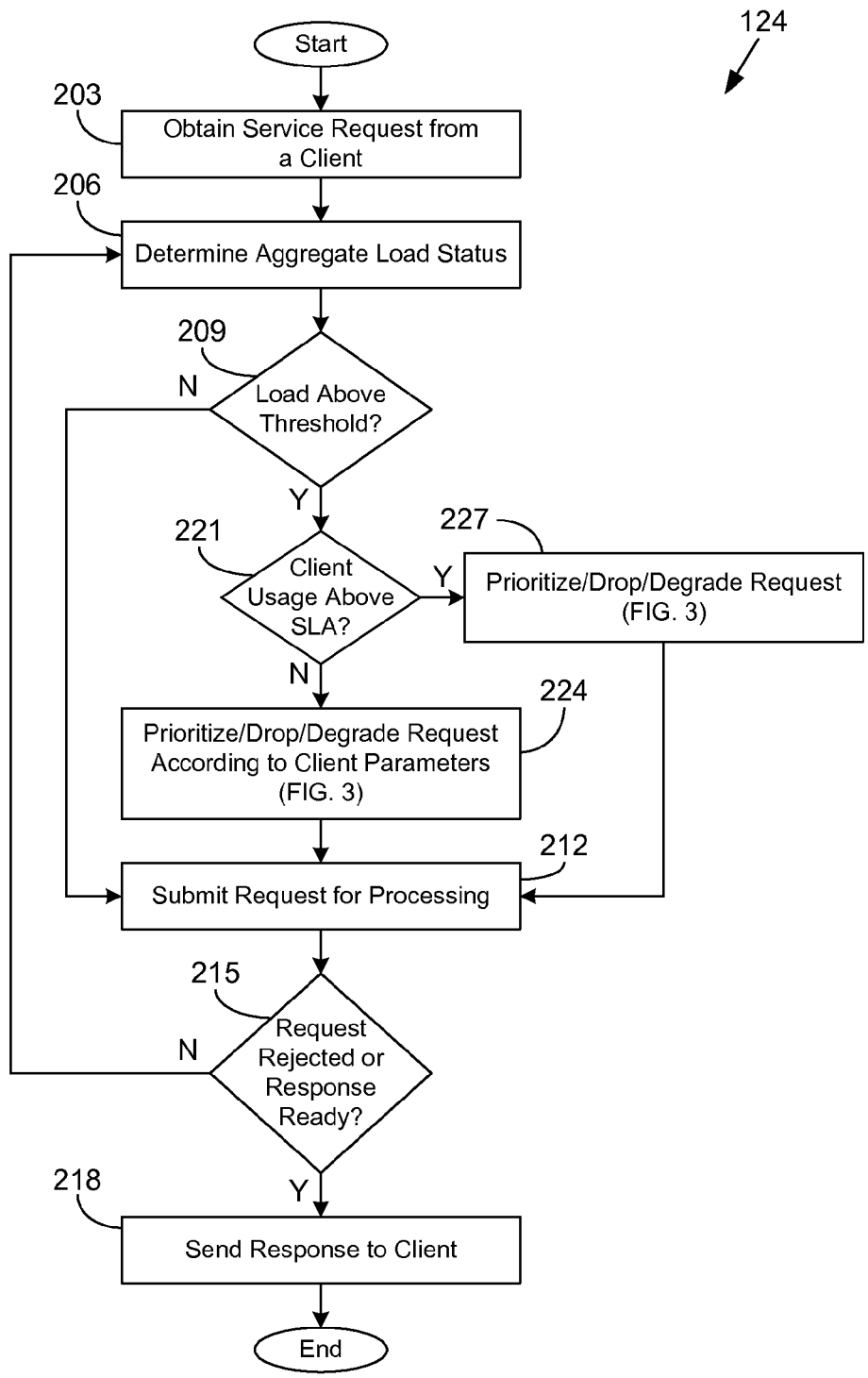
FIGS. 2 and 3 are flowcharts illustrating examples of functionality implemented as portions of a request prioritization application executed in a computing device in the networked environment of FIG. 1 according to various embodiments of the present disclosure.

Referring next to FIG. 2, shown is a flowchart that provides one example of the operation of a portion of the request prioritization application 124 according to various embodiments. It is understood that the flowchart of FIG. 2 provides merely an example of the many different types of functional arrangements that may be employed to implement the operation of the portion of the request prioritization application 124 as described herein. As an alternative, the flowchart of FIG. 2 may be viewed as depicting an example of steps of a method implemented in the computing device 103a (FIG. 1) according to one or more embodiments.

Beginning with box 203, the request prioritization application 124 obtains a service request 127 (FIG. 1) from a service client 106 (FIG. 1). The service request 127 is destined for processing by a service provider application 115 (FIG. 1). In one embodiment, the request prioritization application 124 may intercept the service request 127 prior to assigning it to one of multiple instances of the service provider application 115 for purposes of load balancing.

In box 206, the request prioritization application 124 determines the aggregate load status associated with the service. The aggregate load status may be computed by the service load monitoring application 121 (FIG. 1) from various load statuses 154 (FIG. 1) obtained from other computing devices 103. In one embodiment, the aggregate load status pertains to the resource utilization of one instance of the service provider application 115. In other embodiments, the aggregate load status may pertain to the resource utilization of multiple instances of the service provider application 115.

In box 209, the request prioritization application 124 determines whether the load associated with the service meets, or exceeds, one or more thresholds. The one or more thresholds are determined relative to a load associated with a brownout condition producing degraded performance across all service requests 127. If the load does not meet the one or more thresholds, the request prioritization application 124 moves to box 212 and submits the request 127 for processing by the service provider application 115. After the processing, the request prioritization application 124 determines whether the request 127 has been rejected or whether a response 130 (FIG. 1) is ready. If a response 130 is ready, the response 130 is sent to the service client 106 that originated the request 127. Thereafter, the request prioritization application 124 ends.

If the request prioritization application 124 determines in box 215 that the response 130 is not ready or that further processing of the request 127 is necessary, the request prioritization application 124 returns to box 206 and again determines the aggregate load status. In this way, the request 127 may be prioritized for additional processing by subsequent processing stages 136 (FIG. 1) of the service provider application 115.

If the request prioritization application 124 determines in box 209 that the load associated with the service does meet or exceed the one or more thresholds, the request prioritization application 124 proceeds to box 221 and determines whether a current resource usage of the service client 106 meets, or exceeds, at least one threshold of a service level agreement 160 (FIG. 1). If the current resource usage of the service client 106 does not meet or exceed the at least one threshold of the service level agreement 160, or if the client identity 139 (FIG. 1) of the service client 106 has not yet been verified by an initial processing stage 133 (FIG. 1) of the service provider application 115, the request prioritization application 124 moves to box 224.

In box 224, the request prioritization application 124 prioritizes, drops, or degrades the request 127 according to client-specified parameters. The functionality of box 224 is described in more detail in connection with FIG. 3. Next, in box 212, if the request 127 has not been dropped, the request 127 may be submitted for processing by the service provider application 115. For example, the request 127 may be submitted to a queue 118 (FIG. 1) or reordered in a queue 118. After the processing, the request prioritization application 124 determines whether the request 127 has been rejected or whether a response 130 is ready. If a response 130 is ready, the response 130 is sent to the service client 106 that originated the request 127. Thereafter, the request prioritization application 124 ends.

If the request prioritization application 124 determines in box 215 that the response 130 is not ready or that further processing of the request 127 is necessary, the request prioritization application 124 returns to box 206 and again determines the aggregate load status. In this way, the request 127 may be prioritized for additional processing by subsequent processing stages 136 of the service provider application 115.

If the current resource usage of the identified service client 106 does meet or exceed one or more thresholds of the service level agreement 160, the request prioritization application 124 proceeds to box 227 and the request prioritization application 124 prioritizes, drops, or degrades the request 127 according to client-specified parameters and rules 157 (FIG. 1) associated with the client identity 139. For example, the request prioritization application 124 may enforce restrictions on the client-specified parameters. If the usage is above the service level agreement 160, the request prioritization application 124 may be configured, as non-limiting examples, to degrade or drop the request 127 regardless of whether the request 127 is indicated to be droppable or past a deadline. The functionality of box 227 is described in more detail in connection with FIG. 3.

Next, in box 212, if the request 127 has not been dropped, the request 127 may be submitted for processing by the service provider application 115. For example, the request 127 may be submitted to a queue 118 (FIG. 1) or reordered in a queue 118. After the processing, the request prioritization application 124 determines whether the request 127 has been rejected or whether a response 130 is ready. If a response 130 is ready, the response 130 is sent to the service client 106 that originated the request 127. Thereafter, the request prioritization application 124 ends.

If the request prioritization application 124 determines in box 215 that the response 130 is not ready or that further processing of the request 127 is necessary, the request prioritization application 124 returns to box 206 and again determines the aggregate load status. In this way, the request 127 may be prioritized for additional processing by subsequent processing stages 136 of the service provider application 115.

Figure 3:
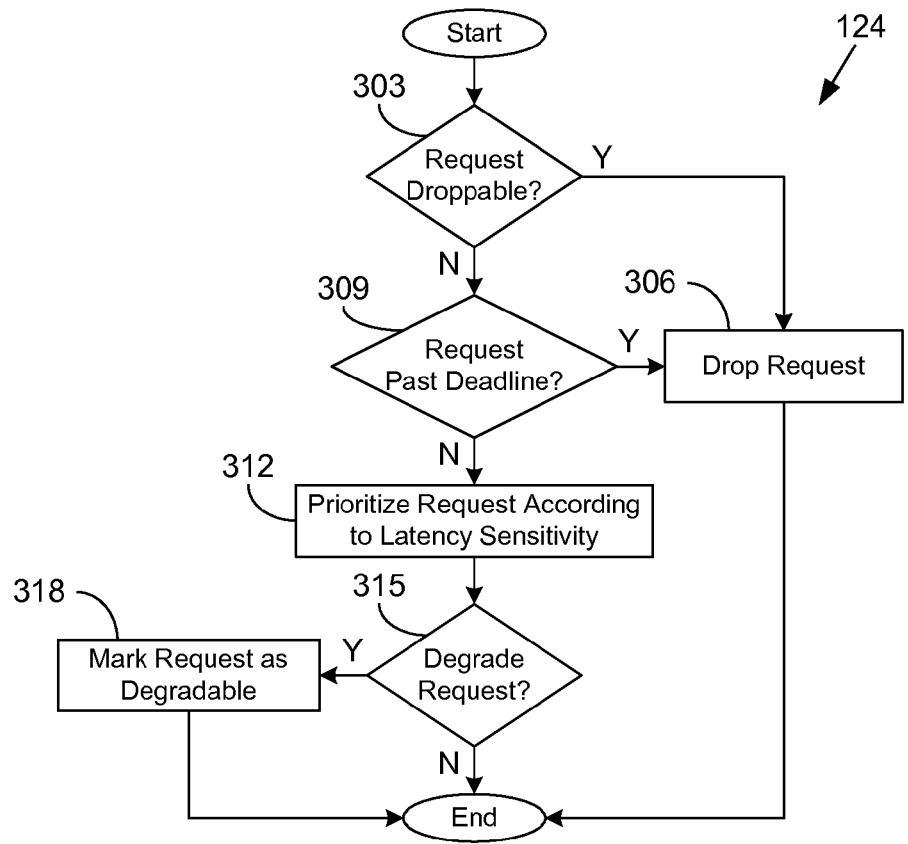

Turning now to FIG. 3, shown is a flowchart that provides one example of the operation of another portion of the request prioritization application 124 according to various embodiments. It is understood that the flowchart of FIG. 3 provides merely an example of the many different types of functional arrangements that may be employed to implement the operation of the portion of the request prioritization application 124 as described herein. As an alternative, the flowchart of FIG. 3 may be viewed as depicting an example of steps of a method implemented in the computing device 103a (FIG. 1) according to one or more embodiments.

Beginning with box 303, the request prioritization application 124 determines whether a request 127 (FIG. 1) is droppable. In one embodiment, the request prioritization application 124 may examine the droppability parameter 142 (FIG. 1) embodied in the request 127. If the request 127 is droppable, the request prioritization application 124 proceeds to box 306 and drops the request 127. Thereafter, the portion of the request prioritization application 124 ends.

If the request 127 is not indicated to be droppable, the request prioritization application 124 moves to box 309 and determines whether processing of the request 127 would result in a response 130 (FIG. 1) being returned past a deadline. The deadline may be determined from a deadline parameter 148 (FIG. 1) embodied in the request 127. If the response 130 would be returned past the deadline, the request prioritization application 124 moves to box 306 and drops the request 127. Thereafter, the portion of the request prioritization application 124 ends.

If the request 127 may be processed before a deadline or if no deadline is set, the request prioritization application 124 proceeds to box 312 and prioritizes the request 127 according to a latency sensitivity parameter 145 (FIG. 1) embodied in the request 127. Such prioritization may involve reordering the position of the request 127 in a queue 118 (FIG. 1) for processing by the service provider application 115 (FIG. 1).

Next, in box 315, the request prioritization application 124 determines whether the request 127 is to be degraded. For example, when a client identity 139 (FIG. 1) has been determined or confirmed, it may be the case that a current resource usage of a service client 106 (FIG. 1) is above a maximum resource usage specified in a service level agreement 160 (FIG. 1). In such a case, a rule 157 (FIG. 1) may specify that the request 127 is to receive degraded processing by the service provider application 115. Such processing may be slower or not as complete as normal processing. If the request 127 is to be degraded, the request prioritization application 124 moves to box 318 and marks the request 127 as degradable. Thereafter, the portion of the request prioritization application 124 ends. If, in box 315, the request 127 is determined not to receive degraded processing, the portion of the request prioritization application 124 also ends.

Figure 4:
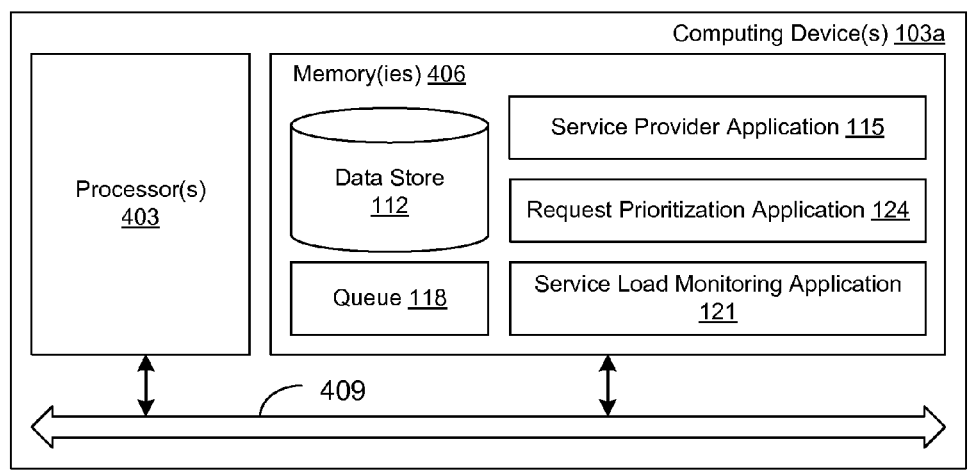
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103a according to an embodiment of the present disclosure. The computing device 103a includes at least one processor circuit, for example, having a processor 403 and a memory 406, both of which are coupled to a local interface 409. To this end, the computing device 103a may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are a service provider application 115, a request prioritization application 124, a service load monitoring application 121, a queue 118, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processors 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format, such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the service provider application 115, the request prioritization application 124, the service load monitoring application 121, the queue 118, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the request prioritization application 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. In some embodiments, some of the blocks may be omitted. Also, two or more blocks shown in succession in FIGS. 2 and 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service provider application 115, the request prioritization application 124, the service load monitoring application 121, and the queue 118, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program comprising:
   code that determines a load associated with a service according to data describing an aggregate load status across a plurality of instances of a service provider application that is configured to provide the service;
   code that determines at least one threshold relative to a load associated with a brownout condition producing degraded performance across all service requests for the service;
   code that, in response to receiving a service request destined for processing by the service provider application, prioritizes the service request when the load associated with the service meets the at least one threshold, the service request being initially prioritized for an initial processing stage of the service provider application based at least in part on a plurality of client-specified parameters included in the service request and indicating a priority of the service request, the service request being subsequently prioritized for an additional processing stage of the service provider application based at least in part on the plurality of client-specified parameters and a result of the initial processing stage; and
   wherein the plurality of client-specified parameters include a droppability parameter indicating whether the service request is droppable, a deadline parameter indicating a deadline for completion of processing of the service request, and a latency sensitivity parameter indicating a latency sensitivity of the service request.

2. The computer-readable medium of claim 1, wherein the initial processing stage determines an identity of a service client that originated the service request, and the subsequent prioritization is based at least in part on a service-level agreement associated with the service client.

3. A system, comprising:
   at least one computing device;
   a service provider application executable in the at least one computing device, the service provider application being configured to provide a service; and
   a request prioritization application executable in the at least one computing device, the request prioritization application comprising:
      logic that, in response to receiving a service request destined for processing by the service provider application, prioritizes the service request when a load associated with the service meets at least one threshold, the service request including at least one client-specified parameter indicating a priority of the service request, the service request being initially prioritized for an initial processing stage of the service provider application based at least in part on the at least one client-specified parameter, the service request being subsequently prioritized for an additional processing stage of the service provider application based at least in part on the at least one client-specified parameter and a result of the initial processing stage.

4. The system of claim 3, wherein the at least one client-specified parameter includes a droppability parameter, and the logic that prioritizes further comprises logic that drops the service request when the droppability parameter indicates that the service request is droppable.

5. The system of claim 3, wherein the at least one client-specified parameter includes a deadline parameter, and the logic that prioritizes further comprises logic that drops the service request when processing of the service request cannot be completed by a deadline indicated by the deadline parameter.

6. The system of claim 3, wherein the at least one client-specified parameter includes a latency sensitivity parameter, and the logic that prioritizes further comprises logic that sequences the service request for processing according to the latency sensitivity parameter.

7. The system of claim 6, wherein the logic that sequences the service request for processing is configured to sequence the service request within a queue containing a plurality of service requests.

8. The system of claim 3, wherein the logic that prioritizes further comprises logic that degrades a processing performance associated with the service provider application processing the service request according to at least one rule.

9. The system of claim 3, wherein the service provider application and the request prioritization application are executable in different ones of the at least one computing device.

10. The system of claim 3, wherein the initial processing stage includes logic that determines an identity of a service client that originated the service request.

11. The system of claim 10, wherein the logic that prioritizes is configured to prioritize the service request for the additional processing stage based at least in part on at least one rule.

12. The system of claim 10, wherein the logic that prioritizes is configured to prioritize the service request for the additional processing stage based at least in part on the identity of the service client.

13. The system of claim 11, wherein the at least one rule comprises logic that drops the service request when a current resource usage of the service client meets at least one threshold of a service level agreement associated with the service client.

14. The system of claim 11, wherein the at least one rule comprises logic that enforces a restriction on the at least one client-specified parameter based at least in part on the identity of the service client.

15. The system of claim 3, wherein the logic that prioritizes is configured to prioritize the service request for the additional processing stage based at least in part on at least one rule, and the at least one rule comprises logic that prioritizes the service request based at least in part on a type of service request.

16. The system of claim 3, wherein the at least one threshold is determined relative to a load associated with a brownout condition producing degraded performance across all service requests.

17. The system of claim 3, wherein the request prioritization application further comprises logic that determines the load associated with the service according to data describing an aggregate load status across a plurality of instances of the service provider application, the data being obtained from at least one other computing device.

18. The system of claim 3, wherein the at least one client-specified parameter comprises a plurality of client-specified parameters including at least one of: a droppability parameter indicating whether the service request is droppable, a deadline parameter indicating a deadline for completion of processing of the service request, or a latency sensitivity parameter indicating a latency sensitivity of the service request.

19. A method, comprising:
receiving, via at least one of one or more computing devices, a service request destined for processing by a service provider configured to provide a service, the service request including at least one client-specified parameter indicating a priority of the service request;
determining, via at least one of the one or more computing devices, a load associated with the service;
prioritizing, via at least one of the one or more computing devices, the service request for an initial processing stage of the service provider when the load meets at least one threshold, the prioritizing being based at least in part on the at least one client-specified parameter; and
prioritizing, via at least one of the one or more computing devices, the service request for at least one additional processing stage of the service provider when the load meets the at least one threshold, the prioritizing being based at least in part on the at least one client-specified parameter and a result of the initial processing stage.

20. The method of claim 19, wherein determining the load associated with the service further comprises:
receiving, via at least one of the one or more computing devices, corresponding load statuses associated with individual ones of a plurality of instances of the service provider; and
determining, via at least one of the one or more computing devices, the load according to the corresponding load statuses.

21. The method of claim 19, wherein the at least one client-specified parameter includes a droppability parameter, a deadline parameter, and a latency sensitivity parameter, and prioritizing the service request for the initial processing stage or the at least one additional processing stage further comprises:
dropping, via at least one of the one or more computing devices, the service request when the droppability parameter indicates that the service request is droppable;
dropping, via at least one of the one or more computing devices, the service request when processing of the service request cannot be completed by a deadline indicated by the deadline parameter; and
sequencing, via at least one of the one or more computing devices, the service request for processing according to the latency sensitivity parameter.

22. The method of claim 19, wherein prioritizing the service request for the at least one additional processing stage is repeated for a plurality of additional processing stages of the service provider.

23. The method of claim 19, wherein prioritizing the service request for the at least one additional processing stage of the service provider further comprises prioritizing, via at least one of the one or more computing devices, the service request for the at least one additional processing stage of the service provider based at least in part on at least one rule and an identity of a service client that originated the service request.

24. The method of claim 23, wherein the at least one rule enforces a restriction on at least one of the at least one client-specified parameter based at least in part on the identity of the service client.

* * * * *